(12) United States Patent
Sato

(10) Patent No.: US 11,048,185 B2
(45) Date of Patent: Jun. 29, 2021

(54) IMAGE FORMING APPARATUS WHICH DETECTS ABNORMALITY IN CONNECTION OF WIRING THAT TRANSMITS IMAGE DATA

(71) Applicant: CANON KABUSHIKI KAISHA, Tokyo (JP)

(72) Inventor: Kazumi Sato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/832,487

(22) Filed: Mar. 27, 2020

(65) Prior Publication Data

US 2020/0225601 A1 Jul. 16, 2020

Related U.S. Application Data

(63) Continuation of application No. PCT/JP2018/036919, filed on Oct. 2, 2018.

(30) Foreign Application Priority Data

Oct. 4, 2017 (JP) .............................. JP2017-194468

(51) Int. Cl.
*G03G 15/04* (2006.01)
*H04N 1/113* (2006.01)
(Continued)

(52) U.S. Cl.
CPC ....... *G03G 15/04036* (2013.01); *H04N 1/113* (2013.01); *H04N 1/32* (2013.01); *B41J 2/45* (2013.01); *B41J 2/47* (2013.01); *G03G 15/0409* (2013.01); *H01S 3/00* (2013.01); *H04N 1/00135* (2013.01); *H04N 1/0318* (2013.01); *H04N 1/0685* (2013.01)

(58) Field of Classification Search
None
See application file for complete search history.

(56) References Cited

U.S. PATENT DOCUMENTS

| | | | |
|---|---|---|---|
| 6,088,050 A | 7/2000 | Ng | 347/237 |
| 9,400,444 B2 | 7/2016 | Sato et al. | G03G 15/043 |

(Continued)

FOREIGN PATENT DOCUMENTS

| | | |
|---|---|---|
| JP | 2007-060569 | 3/2007 |
| JP | 2008-080739 | 4/2008 |

(Continued)

OTHER PUBLICATIONS

International Preliminary Report on Patentability and Written Opinion in counterpart parent Application No. PCT/JP2018/036919 together with English translation.

*Primary Examiner* — Haris Sabah
(74) *Attorney, Agent, or Firm* — Venable LLP

(57) ABSTRACT

An image controller of an image forming apparatus is configured to generate a light emission signal for detection for forming light emission for detection, and transmit the light emission signal for detection to a laser controller through a flexible flat cable, and the laser controller is configured to cause a semiconductor laser to emit light in accordance with the light emission signal for detection, and determine, based on a PD signal output from a PD that has received a light beam, whether improper connection has occurred in the flexible flat cable.

8 Claims, 7 Drawing Sheets

(51) Int. Cl.
*H04N 1/32* (2006.01)
*H01S 3/00* (2006.01)
*H04N 1/00* (2006.01)
*B41J 2/47* (2006.01)
*H04N 1/031* (2006.01)
*H04N 1/06* (2006.01)
*B41J 2/45* (2006.01)

(56) References Cited

U.S. PATENT DOCUMENTS

| | | | |
|---|---|---|---|
| 9,525,795 B2 | 12/2016 | Sato et al. | H04N 1/00891 |
| 9,851,655 B2 | 12/2017 | Sato | G03G 15/0178 |
| 10,303,080 B2 | 5/2019 | Ishidate et al. | B41J 2/47 |
| 2004/0126168 A1* | 7/2004 | Fujimoto | B41J 2/471 |
| | | | 400/118.2 |
| 2010/0141731 A1* | 6/2010 | Ko | B41J 2/451 |
| | | | 347/247 |
| 2012/0105563 A1* | 5/2012 | Sakita | G03G 15/80 |
| | | | 347/118 |
| 2013/0093827 A1* | 4/2013 | Kondoh | G02B 27/0006 |
| | | | 347/224 |
| 2016/0116858 A1* | 4/2016 | Sato | G03G 15/043 |
| | | | 347/116 |
| 2017/0094113 A1 | 3/2017 | Togashi | H04N 1/401 |

FOREIGN PATENT DOCUMENTS

| | | |
|---|---|---|
| JP | 2009-025564 | 2/2009 |
| JP | 2012-098540 | 5/2012 |
| JP | 2017-063299 | 3/2017 |

* cited by examiner

IMAGE FORMING APPARATUS WHICH DETECTS ABNORMALITY IN CONNECTION OF WIRING THAT TRANSMITS IMAGE DATA

CROSS-REFERENCE TO RELATED APPLICATIONS

This application is a Continuation of International Patent Application No. PCT/JP2018/036919, filed Oct. 2, 2018, which claims the benefit of Japanese Patent Application No. 2017-194468, filed Oct. 4, 2017, both of which are hereby incorporated by reference herein in their entirety.

BACKGROUND OF THE INVENTION

Field of the Invention

The present invention relates to an electrophotographic image forming apparatus.

Description of the Related Art

In the related art, an electrophotographic image forming apparatus includes an image control apparatus and a light scanning apparatus. The image control apparatus includes an original reading apparatus for copying, and an image processing apparatus configured to process image data in accordance with data from a personal computer, or other device. The image control apparatus has mounted on a circuit board thereof a CPU, an ASIC, and other devices, and is configured to perform image processing for printing the image data on a sheet, and transmit an image as an electric signal (image signal) to the light scanning apparatus. Further, the light scanning apparatus is configured to deflect a light beam emitted from a light source by a rotary polygon mirror, and the deflected light beam is scanned (hereinafter referred to as "main scan") on a photosensitive member via an fθ lens to form an electrostatic latent image.

The light scanning apparatus includes another circuit board configured to control the light source, and the other circuit board has mounted thereon an IC having a control function, such as keeping a light power of the light source constant (hereinafter referred to as "APC"). The light control apparatus including the circuit board configured to control the light source causes the light source to emit light in accordance with the image signal transmitted from the image control apparatus. Here, as means for transmitting the electric signal from the image control apparatus to the light control apparatus, a flat cable, such as a flexible flat cable (FFC), is used to connect connectors on the circuit boards. In the related art, in order to electrically detect a connection state of the flat cable to the connectors, there is known a method of detecting the connection state of the flat cable to the connectors by a method called "loop back" in which transmitted signals are directly returned with the use of two wirings of the flat cable (see, for example, Japanese Patent Application Laid-Open No. 2007-060569).

However, when dust or the like enters a connecting portion between wirings, other than the above-mentioned two wirings included in the flat cable, and the connectors, with the method disclosed in Japanese Patent Application Laid-Open No. 2007-060569, an abnormality of the connection state may not be detected. In particular, when improper connection occurs in a wiring portion for transmitting the image data from the circuit board of the image control apparatus to the circuit board of the light scanning apparatus, the following problem occurs. Specifically, control data for controlling the light scanning apparatus can be transmitted from the circuit board of the image control apparatus to the circuit board of the light scanning apparatus, and the light scanning apparatus is thereby activated with the control data. When improper connection occurs in the wiring portion for transmitting the image data under such state, an abnormal image is liable to output. In this case, it is uncertain whether there is an abnormality in the image control apparatus, there is an abnormality in the light scanning apparatus, or there is an abnormality in between the flat cable and the connector portions, and hence large amounts of time and load are required for maintenance of the image forming apparatus.

SUMMARY OF THE INVENTION

In order to solve the above-mentioned problem, according to an embodiment of the present invention, there is provided an image forming apparatus, comprising: a light scanning apparatus including: a first circuit board, on which a connector is mounted and on which at least a light emitting unit configured to emit a light beam, a light receiving unit configured to receive the light beam emitted from the light emitting unit, and a light source controller configured to control the light emitting unit are mounted; and a rotary polygon mirror configured to scan the light beam emitted from the light emitting unit on a photosensitive member; a second circuit board, on which a connector is mounted and on which an image signal generation portion configured to generate an image signal corresponding to image data is mounted; and a flat cable configured to connect the first circuit board and the second circuit board in order to transmit the image signal generated by the image signal generation portion to the light source controller, wherein the flat cable includes a plurality of wirings, at least one of the plurality of wirings being a line for transmitting, to the light emitting unit, the image signal for causing the light emitting unit to emit light, wherein the image signal generation portion is configured to generate a light emission data signal for detection for forming light emission data for detection, and transmit the light emission data signal for detection to the light source controller through the line of the flat cable for transmitting the image signal for causing the light emitting unit to emit light, and wherein the light source controller is configured to cause the light emitting unit to emit light in accordance with the light emission data signal for detection, and determine, based on an output signal output from the light receiving unit that has received the light beam from the light emitting unit, whether improper connection of the line of the flat cable for transmitting the image signal for causing the light emitting unit to emit light has occurred.

Further features of the present invention will become apparent from the following description of exemplary embodiment with reference to the attached drawings.

DESCRIPTION OF THE EMBODIMENTS

Now, an exemplary embodiment of the present invention is described in detail with reference to the drawings.

(Configuration of Entire Image Forming Apparatus)

Figure 1:
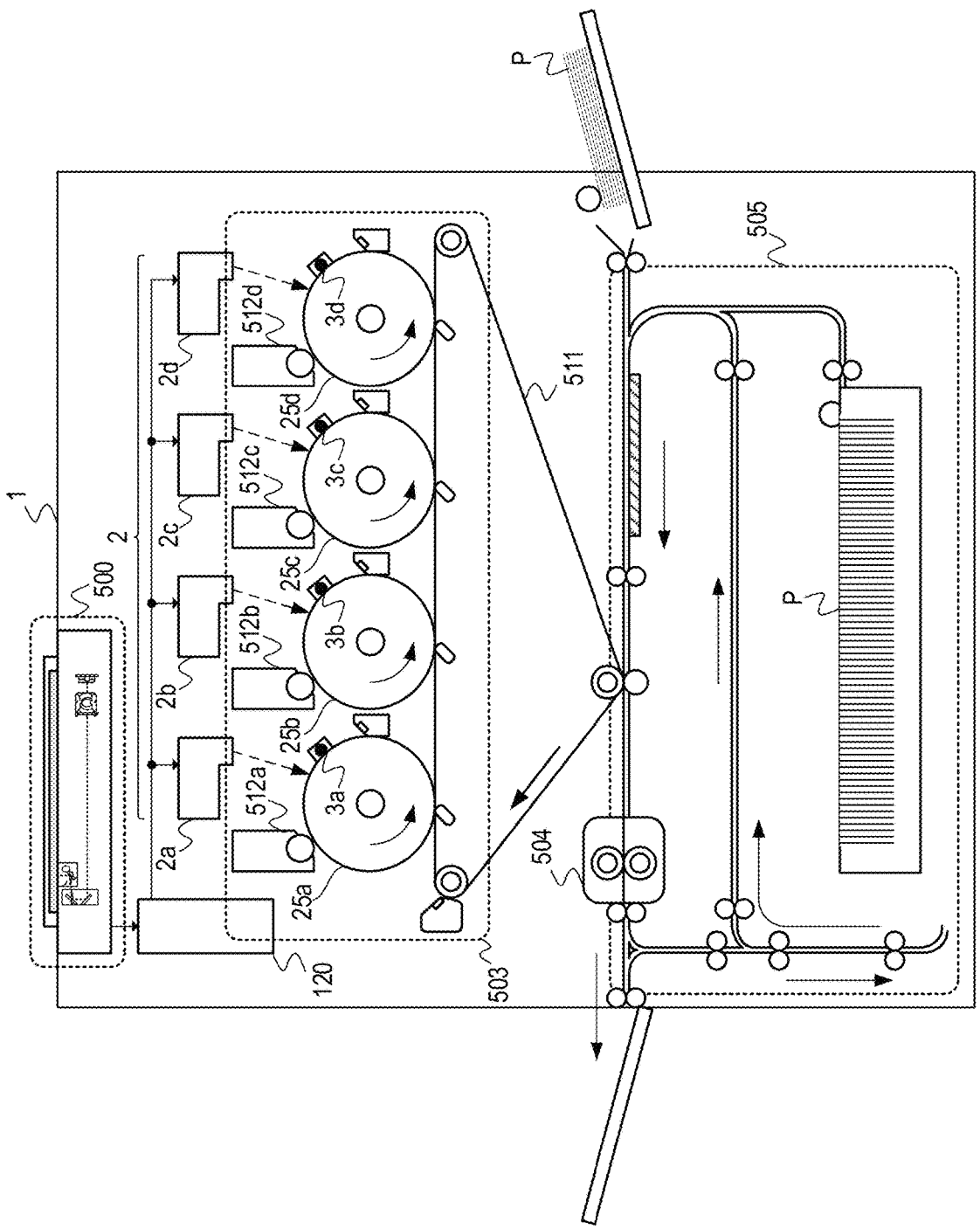
FIG. 1 is a view for illustrating a configuration of an entire image forming apparatus according to an embodiment of the present invention.

An electrophotographic image forming apparatus 1 according to the embodiment is described. In FIG. 1, a configuration of the entire image forming apparatus 1 is illustrated. The image forming apparatus 1 includes light scanning apparatus 2a, 2b, 2c, and 2d, a controller 120, a reader-scanner portion 500, an image forming portion 503 including photosensitive drums 25a, 25b, 25c, and 25d, a fixing portion 504, and a sheet feeding/conveying portion 505. Suffixes "a", "b", "c", and "d" to the reference numerals indicate yellow, magenta, cyan, and black, and the suffixes "a", "b", "c", and "d" to the reference numerals are hereinafter omitted except when a description is given for a particular color.

The reader-scanner portion 500 is configured to irradiate, with light, an original placed on an original table to optically read an original image, and to convert the read image into an electric signal to generate an image signal. A light source included in the light scanning apparatus 2 is configured to emit light in accordance with the image signal, and a light beam emitted from the light source irradiates the photosensitive drum 25 (photosensitive member). The controller 120 is configured to perform light emission control on the light scanning apparatus 2 and generate the image signal. The image forming portion 503 is configured to drive the photosensitive drum 25 to rotate, to charge a surface of the photosensitive drum 25 by a charger 3, and to cause the light scanning apparatus 2 to form a latent image on the photosensitive drum 25. The image forming portion 503 is configured to cause a developing unit 512 to develop the latent image on the photosensitive drum 25 into a visible image with a toner. Then, the image forming portion 503 transfers the toner image formed on the photosensitive drum 25 onto an intermediate transfer belt 511 installed in the image forming portion 503, and collects minute toner remaining on the photosensitive drum 25 without being transferred.

The image forming portion 503 realizes the series of electrophotographic processes by including a series of four developing units 512 (developing stations). The series of four developing units 512, which are arranged in order of yellow (Y), magenta (M), cyan (C), and black (K) from the left of FIG. 1 sequentially perform image forming operations for magenta, cyan, and black after a predetermined period of time has elapsed since the start of image forming in the yellow station. Through this timing control, full-color toner images are sequentially transferred onto the intermediate transfer belt 511 to be superimposed on one another. The toner images formed on the intermediate transfer belt 511 are transferred onto a sheet P. The fixing portion 504 is formed of a combination of rollers and a belt, and includes a heat source, such as a halogen heater. The fixing portion 504 is configured to melt and fix, with heat and pressure, an unfixed toner on the sheet P having the toner images transferred from the surface of the intermediate transfer belt 511.

(Photosensitive Drum and Optical Scanning Apparatus)

Figure 2:
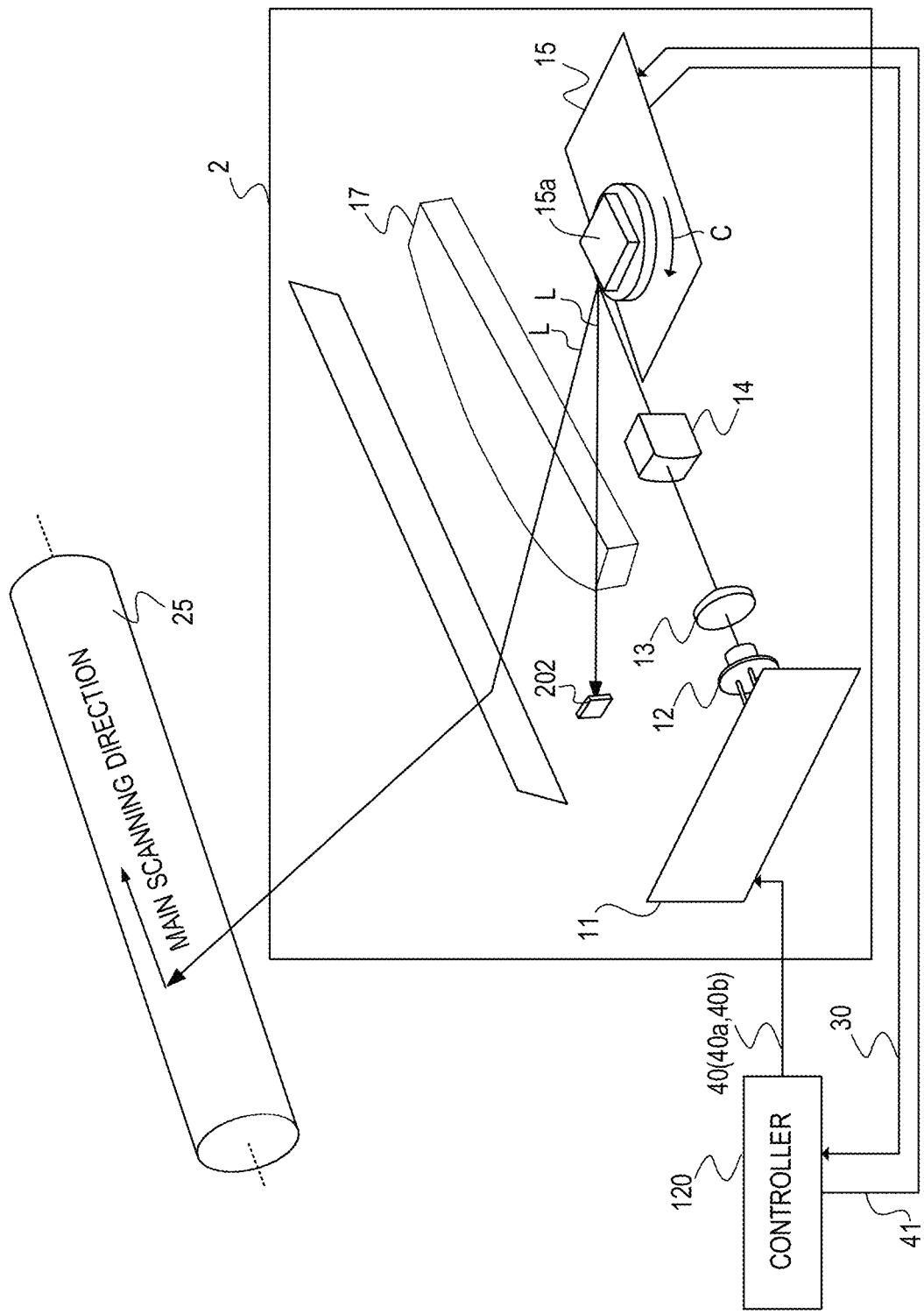
FIG. 2 is a view for illustrating a configuration of an entire light scanning apparatus in the embodiment.

FIG. 2 is a schematic view for illustrating a configuration of the light scanning apparatus 2 and its surrounding optical system. A semiconductor laser 12 mounted on a laser control circuit board 11 is an example of a light emitting unit, and is configured to output light beams modulated in accordance with image signals 40 (40a and 40b). A collimator lens 13 is configured to convert the light beams emitted from the semiconductor laser 12 into parallel light fluxes. A cylindrical lens 14 has a predetermined refractive power (degree of refractiveness) only in a sub-scanning direction. The cylindrical lens 14 is configured to form the light beams into an elliptical image that is long in a main scanning direction on a reflective surface of a rotary polygon mirror 15a. The rotary polygon mirror 15a is configured to rotate at a constant speed in a direction indicated by the arrow C of FIG. 2 by a motor 15, and to deflectively scan a light beam L formed into the image on the reflective surface. A toric lens 17 is an optical element having an fθ characteristic, and is an optical component having different refractive indices in the main scanning direction and the sub-scanning direction. A light beam detecting element 202, which corresponds to a sensor, is arranged outside an image area in the main scanning direction of the photosensitive drum 25, in other words, at a position corresponding to a non-image area, and is configured to detect the light beams reflected by the rotary polygon mirror 15a, and to output a detection signal. The detection signal is also called a beam detect (BD) signal, and is used to determine a timing to start writing an image in the main scanning direction. The light beam detecting element 202 is hereinafter referred to as the "BD 202".

On the photosensitive drum 25, spots of the light beams are moved linearly in parallel to an axis of rotation of the photosensitive drum 25 through the deflective scanning by the rotary polygon mirror 15a. When a multi-beam laser configured to emit a plurality of light beams is used as the semiconductor laser 12, a strip-shaped electrostatic latent image having a predetermined width can be formed on the surface of the photosensitive drum 25 in one main scan. The motor 15 is driven to be rotated with a rotation control signal 41 from the controller 120, such as an engine controller, and is controlled through monitoring an FG signal 30 indicating a rotation state of the motor 15 so that a rotation speed of the motor 15 becomes a predetermined rotation speed. In this manner, the light beams are scanned in the sub-scanning direction.

(Control Circuit Board Configuration and Control Block Diagram)

Figure 3:
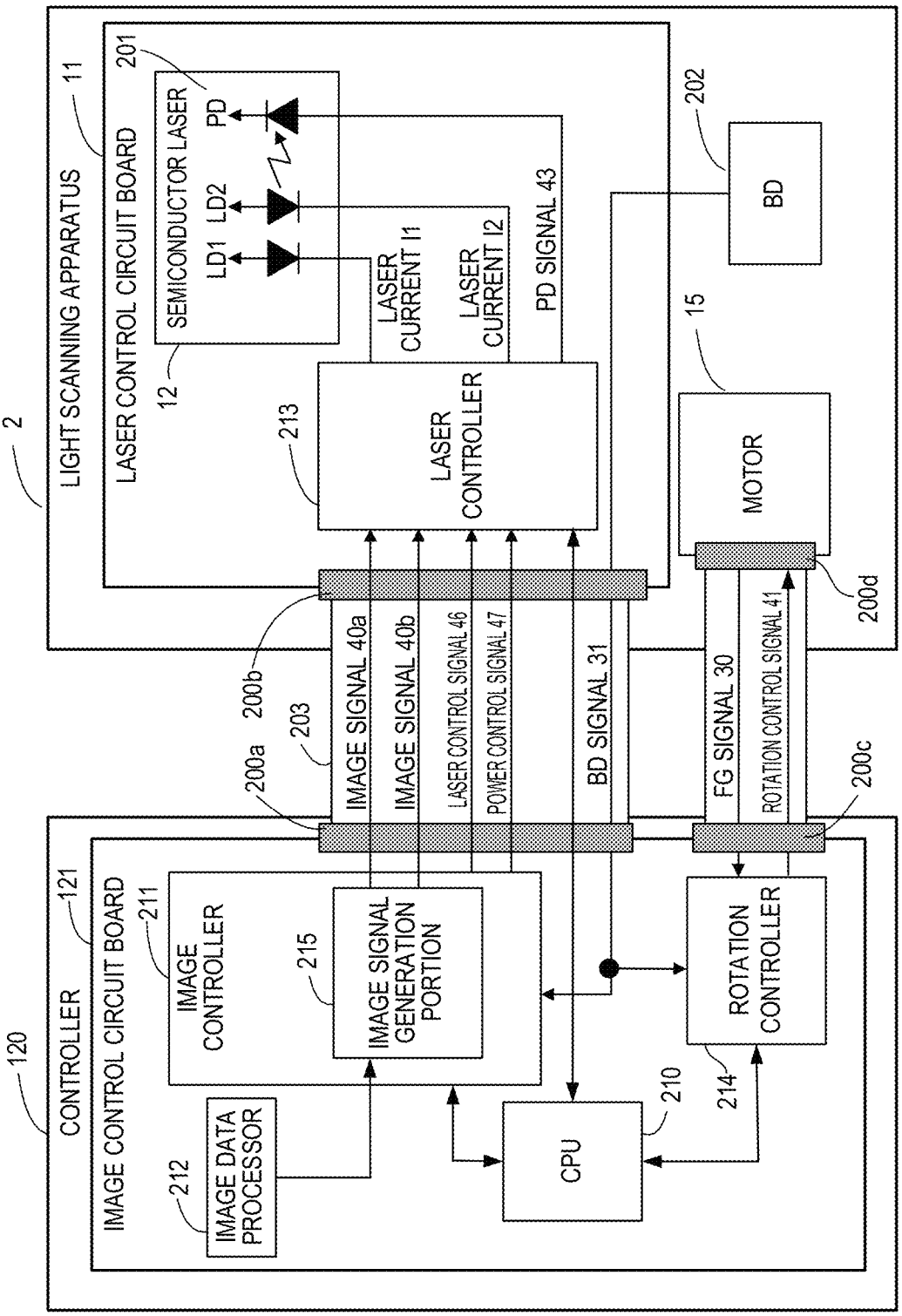
FIG. 3 is a control block diagram of a controller and a light scanning apparatus in the related art for comparison with the embodiment.

FIG. 3 is a control block diagram of a controller 120 and a light scanning apparatus 2 in the related art for comparison with the embodiment, which is to be described later. In FIG. 3, there is illustrated a configuration for a case of emitting two light beams with the use of a semiconductor laser 12 including two light emitting elements (laser diodes: LDs) LD1 and LD2 for each color. FIG. 3 is a block diagram for illustrating a schematic configuration for forming an image of one predetermined color of Y, M, C, and K. Therefore, the apparatus configured to form a color image as in the image forming apparatus 1 according to this embodiment includes four semiconductor lasers 12. However, depending on the configuration, the configuration may include one light emitting element or a plurality of light emitting elements for each color. Further, there may also be a configuration including one BD 202 and one motor 15 to control the respective colors, or a configuration including one BD 202 and one motor 15 for Y and M, and one BD 202 and one motor 15 for C and K to control the respective colors, and the present invention is not limited to the configuration illustrated in FIG. 3.

On an image control circuit board 121 corresponding to a second circuit board of the controller 120, a CPU 210, an image controller 211, an image data processor 212, and a rotation controller 214 are mounted. The light scanning apparatus 2 includes the laser control circuit board 11 corresponding to a first circuit board, the motor 15, and the BD 202. On the laser control circuit board 11, a laser controller 213 and the semiconductor laser 12 are mounted. The rotation controller 214 and the BD 202 may be mounted on the laser control circuit board 11.

When the rotation control signal 41 is transmitted from the rotation controller 214 to the motor 15, the motor 15 transmits, to the rotation controller 214, the FG signal 30 indicating a rotation speed (or the number of revolutions per unit time) of the motor 15. The rotation controller 214 and the motor 15 transmit signals to each other with a connector 200c mounted on the image control circuit board 121 and a connector 200d mounted on the laser control circuit board 11 being connected to each other through a flat cable. The rotation controller 214 is configured to control the rotation speed of the motor 15 with the use of the rotation control signal 41 until the rotation speed of the motor 15 reaches the predetermined rotation speed. Further, when the light beams emitted from the light emitting elements LD1 and LD2 corresponding to light emitting units in the semiconductor laser 12 reach the BD 202, a BD signal 31 corresponding to a detection signal is transmitted to the image controller 211 and the rotation controller 214. The BD signal 31 is a signal indicating a reference timing for forming the image.

A timing to perform power control of the light beams and a timing to emit the light beams in response to the image signals are controlled by the laser controller 213 corresponding to a light source controller configured to control the light emitting elements LD1 and LD2 of the semiconductor laser 12. The laser controller 213 is provided to correspond to the semiconductor laser 12 of each color. When a light power of the light beam L is to be controlled to a predetermined amount, the laser controller 213 adjusts an electric current allowed to flow through the light emitting element LD to be controlled so that an output signal of a light receiving element (photo diode: PD) 201 corresponding to a light receiving unit accompanying the light emitting element LD becomes a predetermined value. This is called "auto power control (APC)". The auto power control is hereinafter referred to as the "APC", and the light receiving element 201 is hereinafter referred to as the "PD 201". The APC cannot be performed during a period in which the light beam L is performing scanning on an area in which the electrostatic latent image is to be formed (image area) on the photosensitive drum 25, and hence is performed at a timing other than the period for scanning the area in which the electrostatic latent image is to be formed (non-image area).

Further, the image controller 211 transmits, to the laser controller 213, laser control signals 46 for switching a control mode. The laser controller 213 drives the semiconductor laser 12 formed of the light emitting elements LD1 and LD2. Specifically, the laser controller 213 controls a light power of the light emitting element LD1 by allowing a laser current I1 to flow through the light emitting element LD1, and controls a light power of the light emitting element LD2 by allowing a laser current I2 to flow through the light emitting element LD2. As described above, the light emitting elements LD1 and LD2 are accompanied by the PD 201, and when the light beams of the light emitting elements LD1 and LD2 are received by the PD 201, the PD 201 outputs a PD signal 43 to the laser controller 213.

The number of laser control signals 46 is determined by the number of operation modes of the laser controller 213. Examples of the operation modes include an APC mode for the light emitting element LD1, an APC mode for the light emitting element LD2, an OFF mode, and an image mode. When the number of light beams L is increased in accordance with the number of light emitting elements LD, the number of APC modes is also increased, and hence the number of control signals is also increased. Further, the image controller 211 corresponding to an image signal generation portion transmits, to the laser controller 213, a power control signal 47 for setting the light powers of the light beams L. The image controller 211 also generates, based on image data on which various kinds of data processing have been performed by the image data processor 212, the image signals 40a and 40b for rendering the image by an image signal generation portion 215. The image controller 211 transmits the generated image signals 40a and 40b to the laser controller 213.

Here, in order to connect electric signals between the image control circuit board 121 and the laser control circuit board 11, a flexible flat cable (hereinafter referred to as "FFC") 203 is used for connectors 200a and 200b on the circuit boards. The image control circuit board 121 and the laser control circuit board 11 are connected to each other through the FFC 203. Further, in FIG. 3, connection with one FFC is illustrated, but a plurality of FFCs may be used, or the FFC may be divided into electrical wires and connectors.

(Connection Detection Method in the Related Art)

Figure 4A:
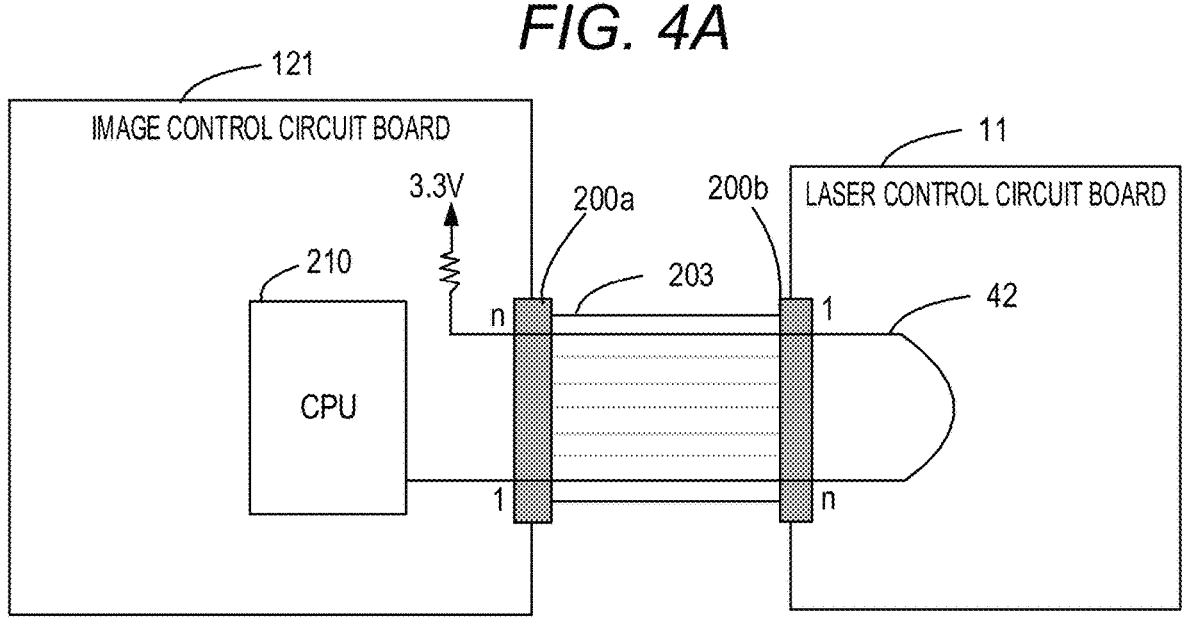
FIG. 4A is a diagram for illustrating a connection checking method in the related art for comparison with the embodiment.

FIG. 4A is a diagram for illustrating a connection state checking method in the related art for the connection of the electric signals between the circuit boards illustrated in FIG. 3. FIG. 4A shows a state in which the connector 200a on the image control circuit board 121 and the connector 200b on the laser control circuit board 11 are connected to each other with the use of the FFC 203. In this embodiment, the connectors are connected in a 1-to-n relationship (for example, 1 and "n", 2 and n−1, . . . , n−1 and 2, and "n" and 1) with the number of contact pins of each of the connectors 200a and 200b being "n". Here, in order to check a connection state of the FFC 203, a signal obtained by pulling up the n-th pin of the connector 200a in the image control circuit board 121 (hereinafter referred to as "pull-up signal") is input and connected to the 1st pin of the connector 200b of the laser control circuit board 11 through the FFC 203. In the laser control circuit board 11, such a loop signal 42 as to electrically connect the 1st pin and the n-th pin of the connector 200b is formed and connected to the 1st pin of the connector 200a of the image control circuit board 121. In the image control circuit board 121, the electric signal of the 1st pin of the connector 200a is input to the CPU 210.

In the CPU 210 corresponding to control means, the pull-up signal (for example, 3.3 V) generated by the image control circuit board 121 is directly returned when the FFC 203 is connected. However, when the FFC 203 is disconnected, the CPU 210 cannot receive the pull-up signal via the loop signal 42, and hence can detect that the FFC 203 is disconnected. Further, in the n-pin connectors 200a and 200b as in this embodiment, the following improper connection may be detected. Specifically, with the loop signal 42 using the 1st pin and the n-th pin at the ends of the connectors 200a and 200b, even when the FFC 203 is connected obliquely, one of the 1st pin and the n-th pin becomes disconnected. Therefore, the improper connection of the FFC 203, such as the oblique connection state, may be detected.

However, when an insulating foreign materials or other materials are caught between an electric connection terminal portion of the FFC 203 and a connection terminal portion inside the connector at other contact pins between the 1st pin and the n-th pin, the portions become disconnected state. However, with the connection state checking method in the related art as in FIG. 4A, the improper connection cannot be detected even when the improper connection has actually occurred in the FFC 203.

(Problem to be Caused when One of Differential Signals is Disconnected)

Figure 4B:
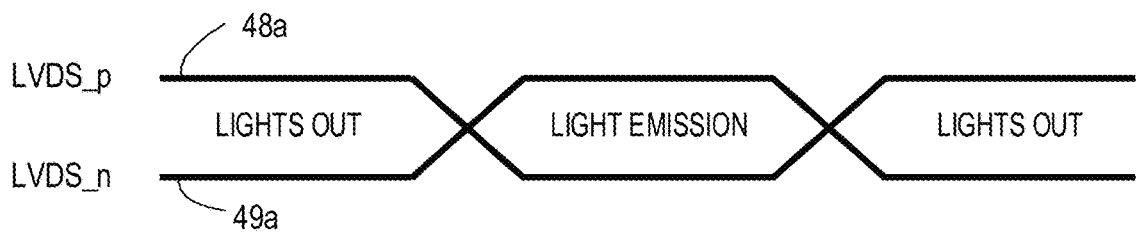
FIG. 4B is a chart for illustrating an operation of controlling a semiconductor laser by a laser controller in the embodiment in response to differential signals under the LVDS standard.
Figure 4C:
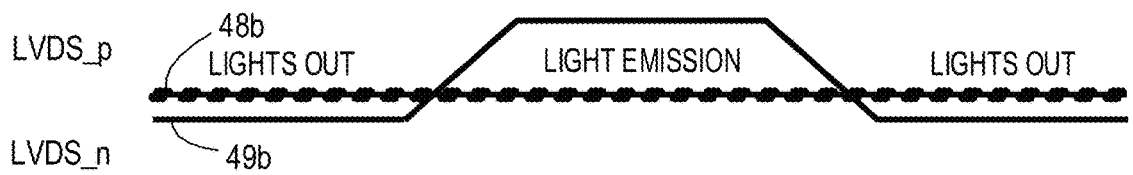
FIG. 4C is a chart for illustrating an operation of controlling the semiconductor laser when improper connection has occurred in LVDS_p.
Figure 4D:
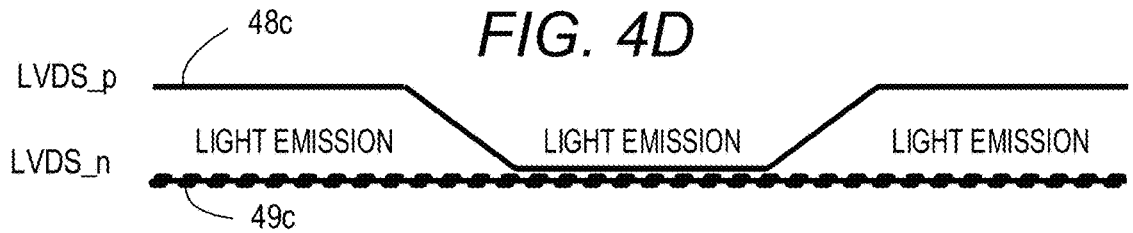
FIG. 4D is a chart for illustrating an operation of controlling the semiconductor laser when improper connection has occurred in LVDS_n.

As the image signals 40a and 40b connected between the image control circuit board 121 and the laser control circuit board 11, differential signals under the low voltage differential signaling (LVDS) standard using two electrical wires may be used. FIG. 4B, FIG. 4C, and FIG. 4D are charts for illustrating the differential signals under the LVDS standard, and operations of controlling the semiconductor laser 12 (light emission or lights out) by the laser controller 213 in response to the differential signals. The laser controller 213 in this embodiment controls the semiconductor laser 12 depending on a potential difference between differential signals LVDS_p 48a and LVDS_n 49a as illustrated in FIG. 4B. The laser controller 213 causes the semiconductor laser 12 to emit light when LVDS_p<LVDS_n. The laser controller 213 extinguishes the semiconductor laser 12 when LVDSp>LVDS_n. In this manner, the laser controller 213 controls the laser currents I1 and I2 flowing through the semiconductor laser 12. The light emission and lights out conditions for the potential difference between LVDS_p and LVDS_n may be reversed.

A case in which improper connection of the FFC 203 as described in FIG. 4A has occurred in the differential signals of the image signals 40 is described below. When improper connection has occurred in the differential signal LVDS_p 48b as in FIG. 4C, a state of the signal is variable, but it is assumed that the differential signal LVDS_p 48b has the illustrated potential level. In this case, the laser controller 213 controls the light emission and lights out of the semiconductor laser 12 depending on the potential of the differential signal LVDS_n 49b, but with the differential signal LVDS_p 48b being variable, correct control on the light emission and lights out of the semiconductor laser 12 cannot be performed. In the case of the improper connection of FIG. 4C, the timing at which the laser controller 213 causes the semiconductor laser 12 to start emitting light and the timing at which the laser controller 213 extinguishes the semiconductor laser 12 are shifted.

Further, when improper connection has occurred in the differential signal LVDS_n 49b as in FIG. 4D, a state of the signal is variable, but it is assumed that the differential signal LVDS_n 49b has the illustrated potential level. In this case, the laser controller 213 causes the semiconductor laser 12 to always emit light irrespective of the potential of the differential signal LVDS_n 49c, and correct control on the light emission and lights out of the semiconductor laser 12 cannot be performed. As described above, when the improper connection occurs in any one of the differential signals, light emission control of the semiconductor laser 12 cannot be correctly performed by the laser controller 213, with the result that an abnormality occurs in an image of a print output from the image forming apparatus 1. The image in which the abnormality has occurred is hereinafter referred to as "abnormal image". Further, a notice of an error from the image forming apparatus 1 is not provided even when the abnormal image has been generated.

(Description of Connection State Detection Method in this Embodiment)

Figure 5:
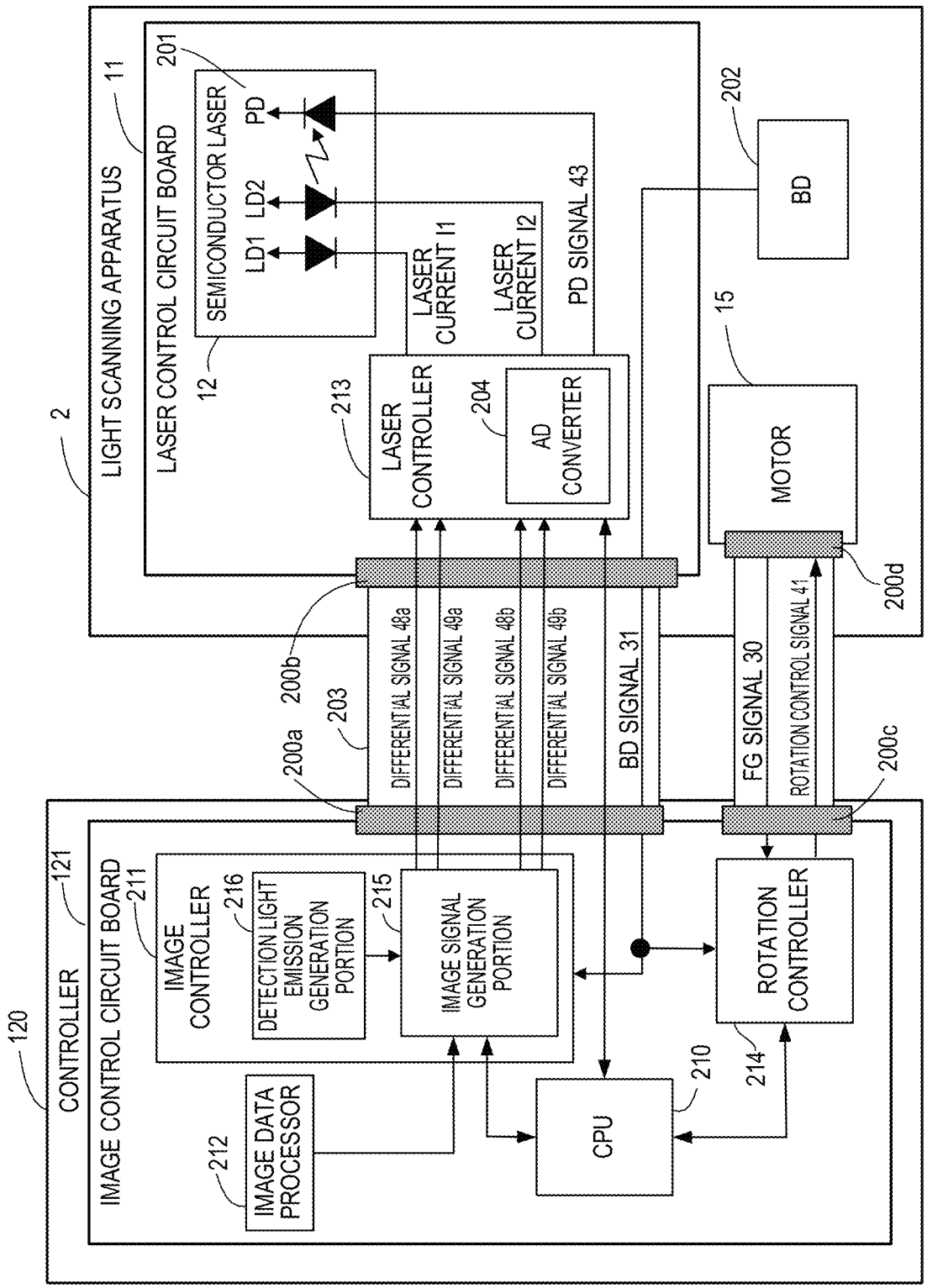
FIG. 5 is a control block diagram of a controller and the light scanning apparatus in the embodiment.

Means for solving the above-mentioned problem in this embodiment is described below. FIG. 5 is a control block diagram in this embodiment obtained by adding, to the control block diagram of the controller 120 and the light scanning apparatus 2 described with reference to FIG. 3, a detection light emission generation portion 216 in the image controller 211, and an AD converter 204 corresponding to a converter in the laser controller 213. The same components as those described with reference to FIG. 3 are denoted by the same reference symbols, and a description thereof is omitted.

The detection light emission generation portion 216 is configured to generate light emission data for detection, which is data for checking connection states of the image signals 40, and to transmit the generated light emission data for detection to the image signal generation portion 215. The image signal generation portion 215 transmits the received light emission data for detection as the differential signals 48a and 48b, and the differential signals 49a and 49b to the laser controller 213. Of the image signals, a signal for light emission for detection is referred to as "light emission signal for detection 45" corresponding to a light emission data signal for detection (see FIG. 6A and FIG. 6B). Further, the AD converter 204 is configured to convert the PD signal 43, which is the output of the PD 201 configured to receive the light beams emitted by the light emitting elements LD1 and LD2 of the semiconductor laser 12, from an analog signal into a digital signal (AD conversion).

Figure 6A:
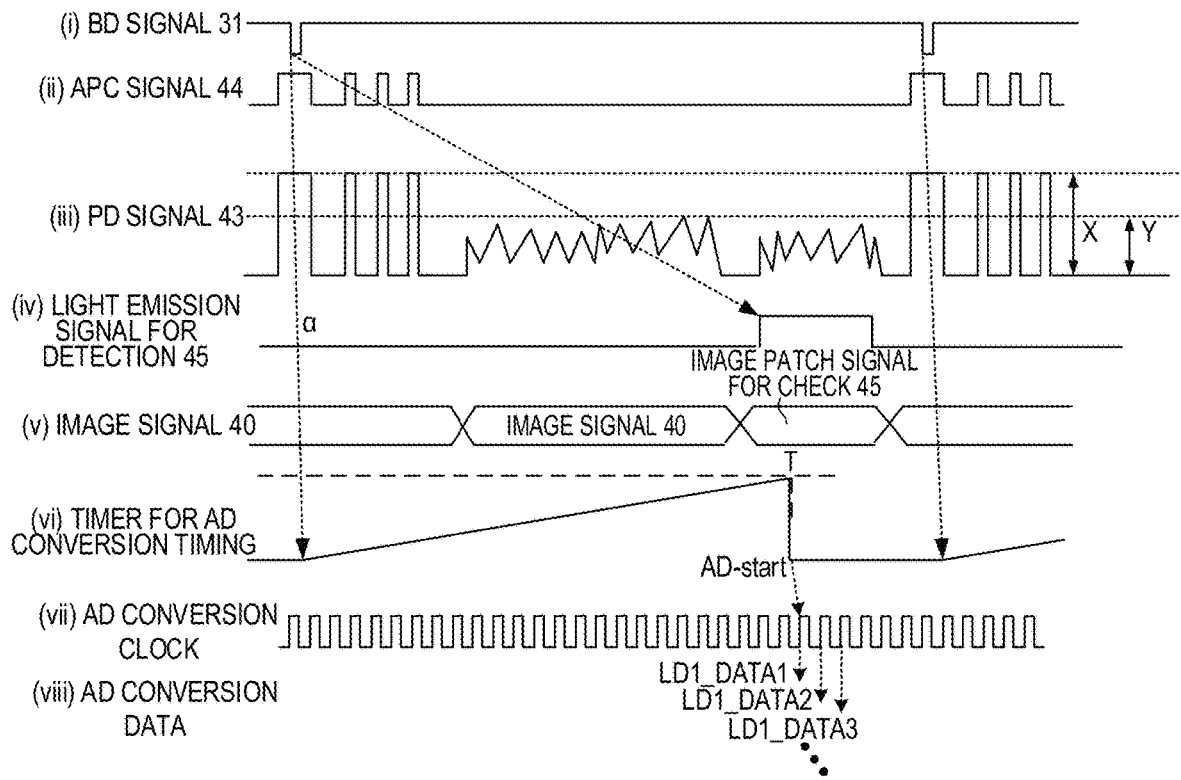
FIG. 6A is a sequence chart for illustrating improper connection determination processing in the embodiment.

Next, a sequence of detecting improper electrical connection of the differential signals 48a, 49a, 48b, and 49b in the FFC 203 is described with reference to FIG. 6A. In FIG. 6A, the part (i) indicates the BD signal 31, the part (ii) indicates an APC signal 44, the part (iii) indicates the PD signal 43, the part (iv) indicates the light emission signal for detection 45, and the part (v) indicates the image signals 40. The image signals 40 are specifically the differential signals 48a, 49a, 48b, and 49b. In FIG. 6A, the part (vi) indicates a timer for AD conversion timing, the part (vii) indicates an AD conversion clock, and the part (viii) indicates AD conversion data. The timer for AD conversion timing is included in the laser controller 213. In FIG. 6A, each horizontal axis indicates time, and it is shown that, with the rotation of the motor 15, the BD signal 31 for determining the timing to start writing the image in the main scanning direction is output during the APC for the light emitting element LD1 as described above. In other words, the BD signal 31 is output from the BD 202, and hence the light emitting elements LD1 and LD2 of the semiconductor laser 12 are in the state of normally emitting light. Therefore, when the PD signal 43 is not output from the PD 201 even with the light emitting elements LD1 and LD2 being controlled to emit light, malfunction of the light emitting elements LD1 and LD2 is excluded from reasons why the PD signal 43 is not output from the PD 201.

The PD signal 43 is output from the PD 201 of the semiconductor laser 12 with the semiconductor laser 12 emitting light. A light power obtained when the PD signal 43 is normally output is defined as a "light power X", for example. Under an APC mode in which the APC is executed in the non-image area, and in which the APC signal 44 is output from the laser controller 213 to the semiconductor laser 12, the PD signal 43 is output in accordance with the APC signal 44.

Next, when the APC mode ends and a transition is made to the image mode, the image signals 40 are output in the image area in which the photosensitive drum 25 is irradiated with the light beams L, and are not output in the non-image area other than the image area. When the image mode ends, and a transition is made from the image area to the non-image area on the photosensitive drum 25, the image controller 211 outputs the light emission signal for detection 45 for checking connection states of the differential signals 48a, 48b, 49a, and 49b, which are used in transmitting the image signals 40. In this embodiment, the light emission signal for detection 45 is an electric signal under a light-up state of the light emitting element LD1 or the light emitting element LD2 as illustrated in FIG. 6A. Here, in order to check the connection states of the differential signals 48a, 48b, 49a, and 49b output in the non-image area, the AD conversion of the PD signal 43 is performed in the AD converter 204. The laser controller 213 activates a timer for AD conversion timing (not shown) with the BD signal 31 being used as a trigger (a in FIG. 6A), and starts counting time by the timer for AD conversion timing. When time T at which the light emission signal for detection 45 is output comes, the laser controller 213 clears the timer for AD conversion timing, and starts the AD conversion of the PD signal 43 by the AD converter 204 (AD-start).

Then, the AD converter 204 outputs the AD conversion data in synchronization with the AD conversion clock of the part (vii), and ends the AD conversion. As to the AD conversion data, AD conversion data corresponding to the light emitting element LD1 is denoted as: LD1_DATA1, LD1_DATA2, LD1_DATA3, and the like. The laser controller 213 determines an average value of the AD conversion data (LD1_DATA1 and the like) output from the AD converter 204. When the average value of the AD conversion data is 50%, which is a threshold value, for example, of the above-mentioned light power X determined in the APC, or more, the laser controller 213 determines that the connection state of the FFC 203 is normal (OK). In the part (iii) of FIG. 6A, the light power X and a threshold value Y are illustrated by the broken lines. In contrast, when the average value of the AD conversion data is less than 50% of the light power X, the laser controller 213 determines that the connection state of the FFC 203 is abnormal (NG), and notifies the CPU 210 of the error. In FIG. 6A, it is shown that the PD signal 43 illustrated in the part (iii) is less than 50% of the light power X in a section in which the image signals 40 and the light emission signal for detection 45 are output.

In this embodiment, because it is known that the semiconductor laser 12 emits minute light when any one of the differential signals LVDS_p and LVDS_n is disconnected, 50% is set as the threshold value for determining whether the connection state is normal. The threshold value for the determination is not limited to 50%.

Figure 6B:
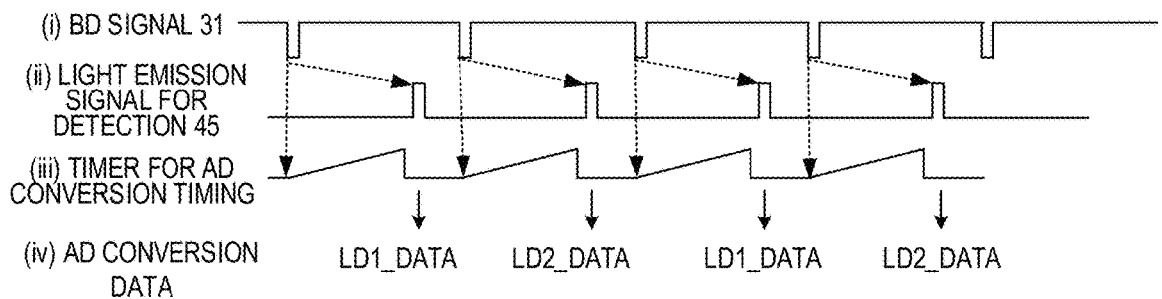
FIG. 6B is a sequence chart for illustrating the improper connection determination processing in the embodiment.

Next, FIG. 6B is a chart for sequentially illustrating the sequences illustrated in FIG. 6A. In FIG. 6B, the part (i) indicates the BD signal 31, the part (ii) indicates the light emission signal for detection 45, the part (iii) indicates the timer for AD conversion timing, the part (iv) indicates the AD conversion data, and each horizontal axis indicates time. Through outputting the light emission signal for detection 45 for each main scan, differential signals for the light emitting element LD1 and differential signals for the light emitting element LD2 can be checked alternately for connection states. The present invention is not limited to the case in which the differential signals for the light emitting element LD1 and the differential signals for the light emitting element LD2 are checked alternately for the connection states, and the check may be performed in any order. Further, in this embodiment, with the connection states being checked in the non-image area, the connection states can be checked without affecting operation of the image forming apparatus 1. Still further, with the connection states being checked in the non-image area, a latent image formed on the photosensitive drum 25 in accordance with the light emission signal for detection 45 is not developed by the toners.

Figure 7:
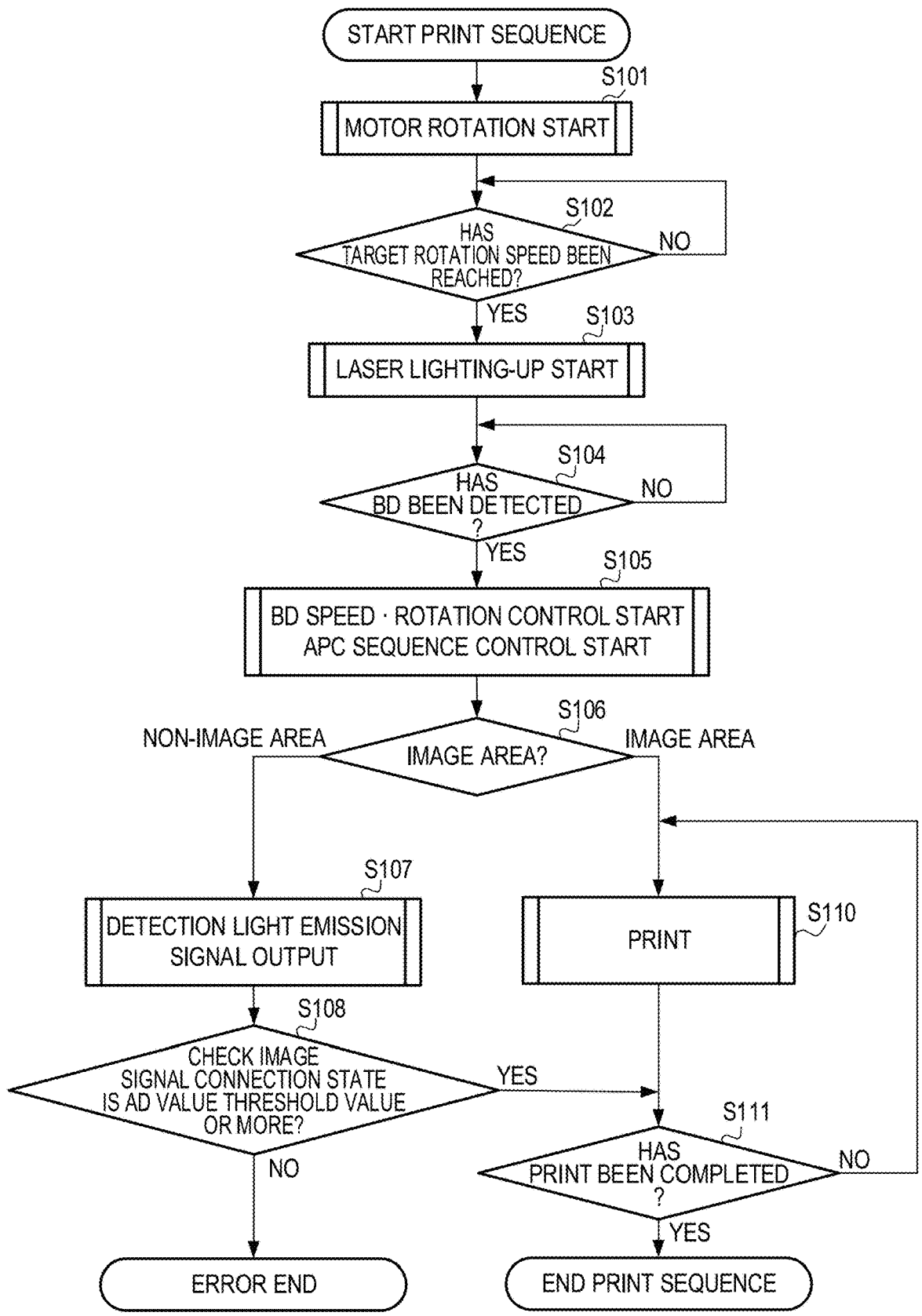
FIG. 7 is a flow chart for illustrating the improper connection determination processing in the embodiment.

Next, improper connection determination processing corresponding to the method of detecting the connection states of the differential signals, which has been described with reference to FIG. 6A and FIG. 6B, is described with reference to a flow chart of FIG. 7. When a print sequence of the image forming apparatus 1 is started, the controller 120 and the like execute processing of Step S101 and the subsequent steps. In Step S101, the controller 120 causes the motor 15 to start rotating by the rotation controller 214. A detailed description of the rotation control on the motor 15 is omitted. In Step S102, the controller 120 determines whether the rotation speed of the motor 15 has reached the predetermined target rotation speed. When the controller 120 determines in Step S102 that the rotation speed of the motor 15 has not reached the predetermined target rotation speed, the processing returns to Step S102. When the controller 120 determines in Step S102 that the rotation speed of the motor 15 has reached the predetermined target rotation speed, the processing proceeds to Step S103.

In Step S103, the laser controller 213 starts lighting-up the semiconductor laser 12. A detailed description of lighting-up control on the semiconductor laser 12 is omitted. In Step S104, the controller 120 determines whether the BD signal 31 has been output from the BD 202, that is, whether the BD signal 31 has been detected. When the controller 120 determines in Step S104 that the BD signal 31 has not been detected, the processing returns to Step S104. When the controller 120 determines in Step S104 that the BD signal 31 has been detected, the processing proceeds to Step S105. In Step S105, the controller 120 starts speed control and rotation control on the motor 15 with the BD signal 31 by the laser controller 213, and transitions to the APC mode to start APC sequence control. Detailed descriptions of the speed control and the rotation control on the motor 15, and the APC sequence control are omitted.

In Step S106, the controller 120 determines whether it is the image area. When the controller 120 determines that it is the non-image area, the processing proceeds to Step S107. When the controller 120 determines that it is the image area, the processing proceeds to Step S110. In Step S107, because of the non-image area, the controller 120 outputs the light emission signal for detection 45 to the laser controller 213. In Step S108, the laser controller 213 determines, in order to check the connection state, whether the AD conversion data obtained by A-D converting the PD signal 43 by the AD converter 204 is the threshold value (for example, 50%) or more. As described above, the laser controller 213 compares the average value of the AD conversion data and the threshold value.

When determining in Step S108 that the average value of the AD conversion data is less than the threshold value, the laser controller 213 determines that abnormal connection has occurred in the FFC 203, and ends the processing with an error. In this case, for example, the laser controller 213 notifies the controller 120 that improper connection has occurred in the FFC 203. When being notified from the laser controller 213 that the improper connection has occurred in the FFC 203, for example the controller 120 suspends the image forming operation, and provides a notice that an improper connection has occurred in the FFC 203 to a display portion of an operation portion (not shown). When determining in Step S108 that the average value of the AD conversion data is the threshold value or more, the laser controller 213 determines that no improper connection has occurred in the FFC 203, and the processing proceeds to Step S111. In this case, error information is not particularly notified from the laser controller 213 to the controller 120, and hence the controller 120 transitions to the image mode to perform a normal printing operation.

In Step S106, because of the image area, the controller 120 transitions to the image mode, and performs the normal printing operation in Step S110. A detailed description of the printing operation is omitted. In Step S111, the controller 120 determines whether the print has been completed, and when the controller 120 determines that the print has not been completed, the processing returns to Step S110. When the controller 120 determines in Step S111 that the print has been completed, the print sequence is ended.

The semiconductor laser 12 includes a plurality of light emitting points, and through causing the light beams to enter the PD 201 from the light emitting points at different timings, respectively, it is determined whether there is an abnormality in wiring portions for the plurality of light emitting points.

The method of detecting the electrical connection state in the case where the differential signals are used as the image signals 40 connected between the image control circuit board 121 and the laser control circuit board 11 have been described above. With the configuration in this embodiment, the connection states of the image signals that have been undetectable in the related-art example can be detected, and the improper connection of the FFC can be detected. Further, the connection state detection described in this embodiment may be performed at all times during the normal operation of the image forming apparatus 1, or may be performed only when the image forming apparatus 1 is powered on, or only during image adjustment, such as color misregistration correction or density correction.

As described above, according to this embodiment, the improper connection of the signal line for transmitting the image signals can be detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus, comprising:
a light scanning apparatus including: a first circuit board, on which a first connector is mounted and on which at least a light emitting unit configured to emit a light beam, a light receiving unit configured to receive the light beam emitted from the light emitting unit, and a light source controller configured to control the light emitting unit are mounted; and
a rotary polygon mirror configured to scan the light beam emitted from the light emitting unit on a photosensitive member;
a second circuit board, on which a second connector is mounted and on which an image signal generation portion configured to generate an image signal corresponding to image data is mounted; and
a flat cable configured to connect the first circuit board and the second circuit board in order to transmit the image signal generated by the image signal generation portion to the light source controller,
wherein the flat cable includes a plurality of wirings, at least one of the plurality of wirings being a line for transmitting, to the light emitting unit, the image signal for causing the light emitting unit to emit light,
wherein the image signal generation portion is configured to generate a light emission data signal for forming light emission data for detection, and further transmit the light emission data signal to the light source controller through the line of the flat cable for transmitting the image signal for causing the light emitting unit to emit the light, and
wherein the light source controller is configured to cause the light emitting unit to emit the light in accordance with the light emission data signal, and determine, based on an output signal output from the light receiving unit that has received the light beam from the light emitting unit, whether improper connection of the line of the flat cable for transmitting the image signal for causing the light emitting unit to emit the light has occurred.

2. The image forming apparatus according to claim 1, wherein the light emitting unit includes a plurality of light emitting points, and
wherein the light source controller is configured to determine whether there is an abnormality in wiring portions for the plurality of light emitting points by causing light beams from the plurality of light emitting points to enter the light receiving unit at different timings, respectively.

3. The image forming apparatus according to claim 1, wherein the light source controller includes a converter configured to convert, from an analog signal to a digital signal, the output signal output from the light receiving unit, and
wherein the light source controller is configured to determine that no improper connection has occurred when determining that the digital signal is a threshold value or more, and determine that the improper connection has occurred when determining that the digital signal is less than the threshold value.

4. The image forming apparatus according to claim 1, further comprising a sensor configured to receive the light beam scanned by the rotary polygon mirror at a position corresponding to a non-image area in a scanning direction of the light beam.

5. The image forming apparatus according to claim 4, wherein the light scanning apparatus includes a motor configured to drive the rotary polygon mirror,
wherein a rotation controller configured to control rotation of the motor is mounted on the second circuit board, and wherein the light source controller lights up the light emitting unit when a rotation speed of the motor has reached a predetermined rotation speed by the rotation controller, and determines whether the improper connection has occurred after the light beam emitted from the light emitting unit has been detected by the sensor.

6. The image forming apparatus according to claim 1, wherein the light source controller is configured to perform, in order to control a light power of the light emitting unit to a predetermined amount in a non-image area in a scanning direction of the light beam scanned by the rotary polygon mirror, auto power control for controlling an electric current allowed to flow through the light emitting unit so that the output signal to be output by the light receiving unit when the light receiving unit receives the light beam emitted from the light emitting unit has a predetermined value.

7. The image forming apparatus according to claim 1, wherein the image signal to be generated by the image signal generation portion is a low voltage differential signal.

8. The image forming apparatus according to claim 1, wherein the flat cable is a flexible flat cable.

* * * * *